(12) United States Patent
Miller et al.

(10) Patent No.: US 7,215,650 B1
(45) Date of Patent: May 8, 2007

(54) ADAPTIVE DATA RATE CONTROL FOR NARROWCAST NETWORKS

(75) Inventors: Mark J. Miller, Encinitas, CA (US); Mark D. Dankberg, Encinitas, CA (US)

(73) Assignee: ViaSat, Inc., Carlsbad, CA (US)

(*) Notice: Subject to any disclaimer, the term of this patent is extended or adjusted under 35 U.S.C. 154(b) by 0 days.

(21) Appl. No.: 09/519,155

(22) Filed: Mar. 6, 2000

Related U.S. Application Data

(60) Provisional application No. 60/149,615, filed on Aug. 16, 1999.

(51) Int. Cl.
*H04B 7/14* (2006.01)
*H04J 1/10* (2006.01)
*H04J 3/08* (2006.01)
*H04J 3/16* (2006.01)
*H04J 3/22* (2006.01)

(52) U.S. Cl. ............................... 370/315; 370/465
(58) Field of Classification Search .......... 370/281, 370/295, 319, 344, 480
See application file for complete search history.

(56) References Cited

U.S. PATENT DOCUMENTS

| 4,228,538 | A |   | 10/1980 | Scharla-Nielsen et al. ...... 455/9 |
|---|---|---|---|---|
| 4,495,619 | A | * | 1/1985  | Acampora ................... 370/207 |
| 4,837,786 | A |   | 6/1989  | Gurantz et al. ................ 370/20 |
| 4,870,642 | A | * | 9/1989  | Nohara et al. ............... 370/319 |
| 4,905,235 | A | * | 2/1990  | Saburi ......................... 370/318 |
| 4,941,199 | A |   | 7/1990  | Saam ........................... 455/10 |
| 5,282,019 | A | * | 1/1994  | Basile et al. ................. 348/488 |
| 5,479,447 | A | * | 12/1995 | Chow et al. ................. 375/260 |
| 5,485,486 | A | * | 1/1996  | Gilhousen et al. .......... 370/335 |
| 5,612,948 | A |   | 3/1997  | Fette et al. |
| 5,715,277 | A |   | 2/1998  | Goodson et al. |
| 5,726,978 | A | * | 3/1998  | Frodigh et al. ............. 370/252 |
| 5,784,363 | A | * | 7/1998  | Engstrom et al. ........... 370/332 |
| 5,812,599 | A | * | 9/1998  | Van Kerckhove ........... 375/260 |
| 5,828,655 | A | * | 10/1998 | Moura et al. ............... 370/236 |
| 5,956,627 | A | * | 9/1999  | Goos ........................ 455/127.1 |

(Continued)

FOREIGN PATENT DOCUMENTS

DE   196 46 371 A1   5/1998

(Continued)

*Primary Examiner*—Huy D. Vu
*Assistant Examiner*—Daniel Ryman
(74) *Attorney, Agent, or Firm*—Townsend and Townsend and Crew LLP; Kenneth R. Allen

(57) ABSTRACT

A system to provide narrowcast communications uses adaptive data rate control to individual subscribers such that the effects of precipitation or other link conditions, which are not common to all subscribers, is mitigated. The invention takes advantage of the fact that the narrowcast data consist of packets which are individually addressed to specific subscribers, or groups of subscribers. The narrowcast data is communicated on a plurality of FDM carriers, each of potentially differing data rates. The subscribers are assigned a particular FDM carrier, based upon their link quality, to receive packets addressed to them. The lower data rate FDM carriers will be less affected by adverse link conditions and are hence assigned to subscribers most likely to incur adverse link conditions.

13 Claims, 3 Drawing Sheets

U.S. PATENT DOCUMENTS

| | | | |
|---|---|---|---|
| 6,157,812 A * | 12/2000 | Sarraf | 455/13.4 |
| 6,167,237 A * | 12/2000 | Rapeli | 455/63.1 |
| 6,310,866 B1 * | 10/2001 | Kronestedt et al. | 370/330 |
| 6,359,901 B1 * | 3/2002 | Todd et al. | 370/465 |
| 6,359,934 B1 * | 3/2002 | Yoshida | 375/262 |
| 6,542,716 B1 * | 4/2003 | Dent et al. | 455/13.1 |

FOREIGN PATENT DOCUMENTS

| | | |
|---|---|---|
| EP | 881 795 A2 | 12/1998 |
| WO | 99/21287 A1 | 4/1999 |

\* cited by examiner

| Group | C/No Range | Carrier Attributes | | | C/No Requirement |
|---|---|---|---|---|---|
| | | α | Data Rate | FEC | |
| 1 | ≥76.1 | 0.25 | 10.0 Mbps | r=7/8 w/ (204,188) | 76.1 dB-Hz |
| 2 | 74.5 to 76.0 | 0.25 | 8.5 Mbps | r=3/4 w/ (204,188) | 74.5 dB-Hz |
| 3 | 71.9 to 74.4 | 0.25 | 5.7 Mbps | r=1/2 w/ (204,188) | 71.9 dB-Hz |
| 4 | 70.1 to 71.8 | 0.25 | 3.8 Mbps | r=1/2 w/ (204,188) | 70.1 dB-Hz |

ADAPTIVE DATA RATE CONTROL FOR NARROWCAST NETWORKS

CROSS-REFERENCES TO RELATED APPLICATIONS

This application claims the benefit of U.S. Provisional Application No. 60/149,615, filed Aug. 16, 1999, and is herein incorporated by reference.

BACKGROUND OF THE INVENTION

The present invention relates to narrowcast communication systems, and more particularly to a method for providing adaptive data rate control for narrowcast communication systems.

A satellite communications narrowcast network typically consists of a large Earth terminal, referred to as a hub, transmitting an uplink to a satellite repeater. The satellite repeater receives, amplifies, and re-transmits the signal on a downlink to a plurality of subscriber terminals. Each of the subscriber terminals receives the downlink signal from the satellite. In many applications the data is individually addressed to a single subscriber terminal or to small group of subscriber terminals (narrowcast) which is a subset of all terminals which receive the transmission. In a typical application, the hub time division multiplexes (TDM) the individually addressed packets data into a single stream. Each subscriber terminal receives and demodulates the downlink data stream, but only processes the data which is individually addressed to that particular subscriber terminal.

To service the largest possible number of subscriber terminals, the hub terminal should transmit the TDM data stream at the highest possible data rate. The received carrier to noise spectral density, C/No, for each of the subscriber terminals may be different and may be time varying due to different link and propagation conditions. Such link conditions are due to, but not limited to, variations in the satellite EIRP to specific subscriber terminals based upon location, as shown by the satellite transmit antenna contours in FIG. 2, or differences in the G/T of the subscriber terminals. Propagation conditions typically result in additional path loss due to precipitation or other atmospheric conditions. Loss due to precipitation, commonly known as "rain fading," is a frequent occurrence in commercial satellite communications and is especially prevalent at Ku band (12–18 GHz) and Ka Band (27–40) GHz transmissions. Since the data must be received by all subscriber terminals, at virtually all times, the data rate, modulation, and forward Error Correction (FEC) coding selected for use must be based upon the worst anticipated C/No amongst all subscriber terminals in the network. This approach results in the selection of a much lower data rate than most subscriber terminals could support for a majority of the time.

Several techniques have been developed to overcome the problem of rain fading. For example, U.S. Pat. No. 4,941, 199 describes a methodology for adjustment of the Hub EIRP as to maintain a constant C/No as seen by the satellite. The adjustment is determined by having the Hub terminal monitor the downlink of it's own transmission. This technique is useful in compensating for rain fading on uplink transmissions but does not provide any compensation for downlink transmissions.

A technique is described in U.S. Pat. No. 4,228,538 that provides uplink and downlink rain fade mitigation on point-to-point satellite links. This approach uses feedback from the receiving terminal on the receiver signal quality. The transmitting terminal adjusts its output power in accordance with the signal quality indication determined by the receiving terminal. The effectiveness of this approach is limited in the case of downlink rain fade because, in many cases, the hub terminal uplink EIRP cannot be arbitrarily increased without having an adverse effect on the transponder operation point or input backoff. Similar schemes have been devised to get around this limitation by using the signal quality indication to vary the code rate of the transmission. Although this eliminates the aforementioned problem, it is still not an acceptable approach for a narrowcast system, where multiple subscriber terminals will, in general, indicate different signal qualities. In addition, adaptation of the code rate alone, from rate=½ to rate=⅞, can typically only provide about 2 dB of adjustment in the Eb/No requirement. If one maintains the symbol rate constant, the information rate will change by 2.4 dB from a rate=½ to rate=⅞ code. The total adjustment range in the C/No requirement is thus about 4.4 dB. For high link availability, this is not sufficient for many rain regions especially in the higher frequency bands, such as the Ka band.

An applicable technique is found in U.S. Pat. No. 4,837, 786. In this patent, Gurantz and Wright describe a method where two orthogonal BPSK carriers are provided using QPSK modulation. One BPSK carrier contains a high data rate where the other uses a lower data rate. In an alternate embodiment of the referenced invention, individual addressing of portions of the frame is described. This embodiment is suitable for narrowcast applications where most ground stations would receive their data on the higher data rate channel. Ground stations adversely affected by precipitation would receive their data on the lower data rate channel. The limitation of this method is that subscriber terminals only have two choices for their quality of service, mainly the higher data rate or the lower data rate. Moreover, 50 percent of the channel resources have to be dedicated to the lower channel rate.

An opportunity exists for a method of data rate control that: i) compensates for the differences in downlink conditions for a narrowcast network; ii) provides a large range of adjustment for the C/No requirement; and iii) provides many different data rates or C/No options.

SUMMARY OF THE INVENTION

The present invention comprises a method for providing adaptive data rate control for satellite narrowcast transmissions. The present invention enables the data rate to be different to different subscriber terminals thus allowing individualized compensation for the affects of downlink rain fading and link parameter variation.

The present invention comprises a satellite repeater to provide connection between the hub terminal uplink and the subscriber terminal downlinks. The hub terminal transmits individually addressed packets to a plurality of subscriber terminals on a plurality of FDM carriers. Subscriber terminals are assigned specific carriers to receive information that will be individually addressed to them. The subscriber terminals shall only need to receive and demodulate one of the multiple FDM carriers originating from the hub terminal's transmission. The subscriber terminals are assigned an FDM carrier based upon their received C/No. Subscriber terminals of like or near like C/No are assigned the same carrier.

In one particular embodiment of the present invention, the number of FDM carriers and the attributes of each carrier are determined a priori based upon an initial estimate of C/No metrics within the anticipated subscriber population. Attributes of the FDM carriers include characteristics such as data rates, the modulation scheme and a coding scheme used on each of the carriers, and the fraction of transponder resources, power and bandwidth, used by each carrier. The estimation of C/No within the subscriber population is mostly a function of subscriber terminal sizes (G/T), satellite EIRP variation over the location of the coverage area, and rain fade statistics for the region of service.

Each subscriber terminal determines a signal quality metric such as C/No based on the quality of its received signals. The quality metrics are communicated to the hub terminal by each of the subscriber terminals. The hub terminal reassigns subscriber terminals to carriers based on the received quality metrics. In this way, each subscriber terminal maintains a maximum data rate as environmental conditions vary over time by being periodically reassigned to a different carrier in response to the changing conditions. The newly assigned carrier would then be used by the subscriber terminal to receive it's data services. Thus, when downlink rain fading occurs, a particular subscriber terminal that would be adversely affected by the rain fade, would be assigned to a different carrier that employs a lower data rate, and hence has a lower C/No requirement.

A return channel is provided for communicating the signal quality metrics from the subscriber terminal to the hub terminal. In one embodiment, the return channel uses the existing satellite communication links. This has the advantage of utilizing existing circuitry to implement the return channel. Alternatively, the return channel can be a ground-based communication link.

In an alternate embodiment of the present invention, the attributes of each FDM carrier may be dynamically altered to accommodate changes in the distribution of C/No amongst the active subscriber terminals. Instead of providing a set of pre-defined carriers, the attributes of the each FDM carriers are periodically redefined to optimize network performance metrics based upon the received signal quality metrics of the subscriber terminals. Attributes of the FDM carriers which can be redefined include, but are not limited to, characteristics such as data rates, the modulation scheme, and a coding scheme used on each of the carriers. Thus, under clear sky conditions, each subscriber terminal can be assigned a particular FDM carrier to receive their information based upon the data rate that each terminal can support and the current loading traffic conditions on each of the carriers. As rain fading in any part of the coverage area starts to occur, the assignment of individual subscriber to FDM carriers as well as the attributes of the individual carriers may be altered to keep the composite network performance optimized.

The present invention is advantageous in that it improves the downlink data rate without requiring an increase in satellite resources, such as bandwidth and power, nor does it require additional EIRP to be provided at the hub terminal.

DESCRIPTION OF THE SPECIFIC EMBODIMENTS

Figure 1:
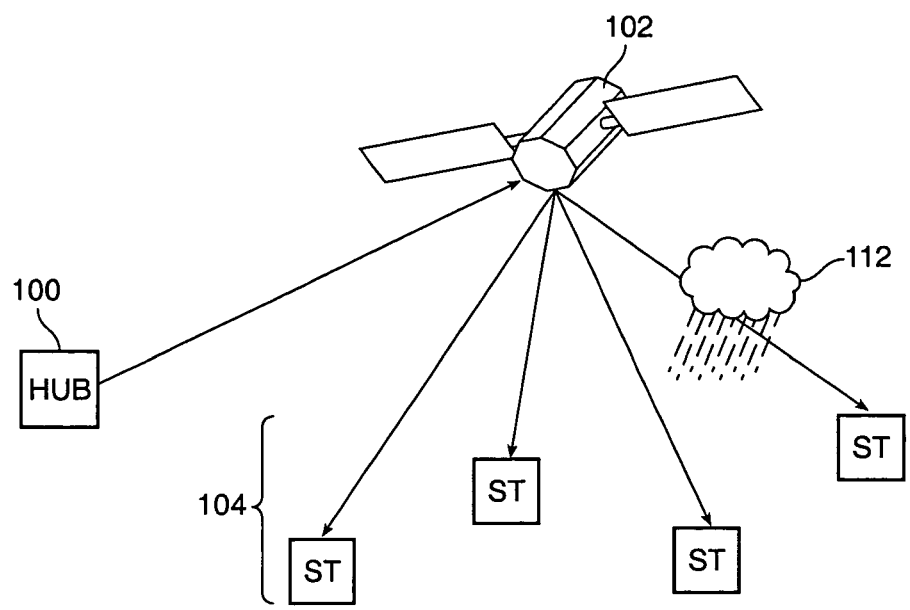
FIG. 1 is a pictorial diagram of hub terminal providing a narrowcast transmission to a plurality of subscriber terminals with rain fade conditions occurring over some but not all subscriber terminals.
Figure 2:
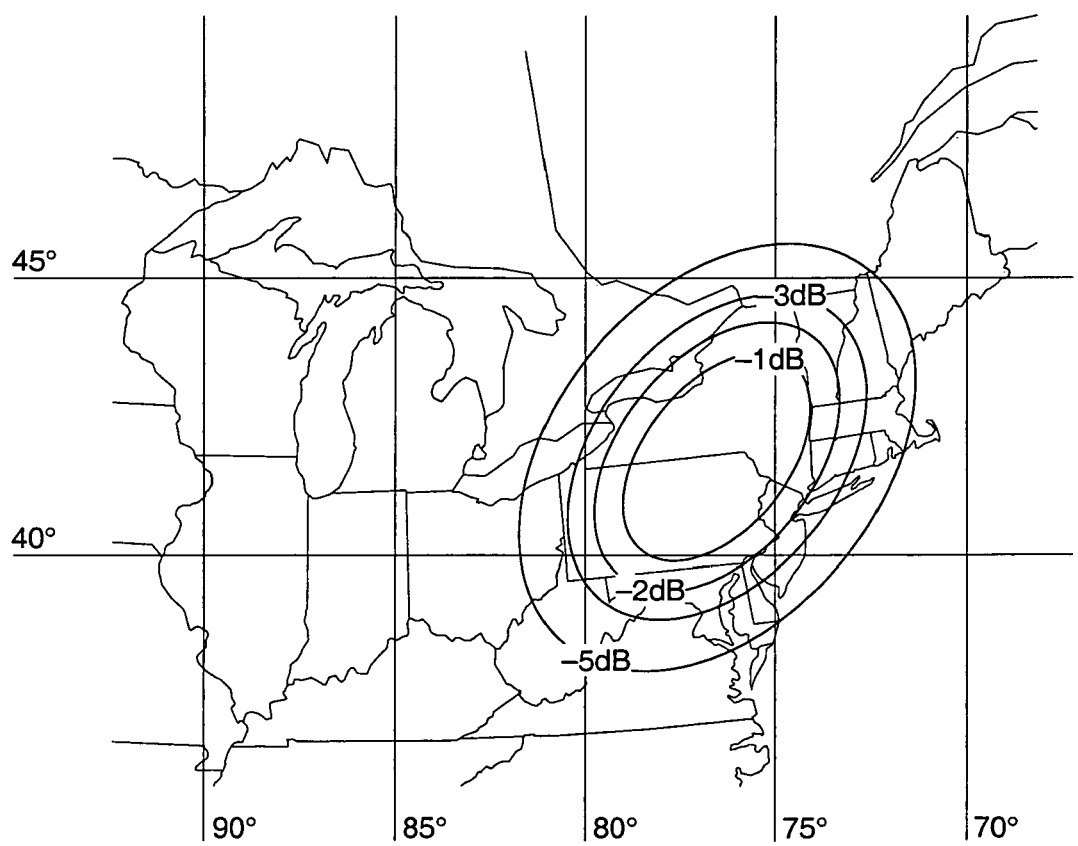
FIG. 2 is a diagram showing contours of differing clear sky link conditions due to the antenna contours of the satellite transmit antenna.

FIG. 1 shows a satellite communications network set up for narrowcast from a hub transmitter 100, through an satellite repeater 102, and down to plurality of subscriber terminals 104. Although only four terminals are shown, the network could consist of many more terminals. The hub terminal 100 transmits a transmission which shall be at least partially demodulated by all subscriber terminals in the network. Rain fading 112 is present on the downlinks to some, but not all, of the subscriber terminals. It is not uncommon for rain fades to be more than 3 dB at Ku band for many rain regions for world. Furthermore, antenna gain contours corresponding to the transmit antenna on the satellite repeater 102 cause the received downlink C/No to vary amongst subscriber terminals. Such antenna gain contours are illustrated in FIG. 2. Subscribers located at or near the −3 dB contour will see a downlink C/No which is 3 dB lower than subscriber terminals located near the center of spot coverage. To ensure service to all subscribers, where service implies a resulting C/No at the subscriber terminal such that the BER is lower than the threshold deemed acceptable, a data rate must be selected consistent with the minimum expected C/No. As an example, using the −3 dB antenna contour with a 3 dB rain fade results in 6 dB variation in downlink C/No. To ensure service to all subscriber terminals within the −3 dB contour and at all times when the rain fade is less than 3 dB, the data rate must be selected based upon a C/No which is 6 dB lower than the C/No of many of the subscriber terminals. This inefficiency results in a reduction of system capacity.

In one embodiment of the invention, the system capacity is increased by the use of multiple FDM (frequency division multiplexed) carriers to convey the information. It is noted that the invention is not limited to any one type of transmission scheme. The invention is described in terms of FDM signaling by way of example only.

Figure 3:
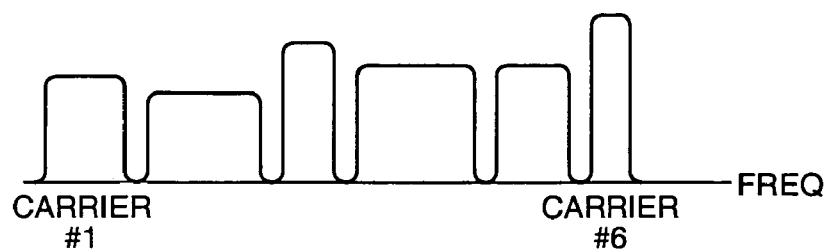
FIG. 3 shows multiple FDM carriers used to convey the narrowcast information.

Continuing, FIG. 3 shows a signal configuration comprising six carriers. For discussion purposes, suppose the narrowcast traffic is broken up into N carriers, numbered 1, 2, ... N. Further, suppose the narrowcast network occupies transponder resources consisting of a total transponder bandwidth of W Hz and a total transponder transmit power output of P Watts. The $n^{th}$ FDM carrier is allocated a fraction of the total transponder bandwidth equal to $a_n W$ Hz and a fraction of the total transponder power equal to $a_n P$ Watts. The parameters $a_n$ are chosen under the constraint that all an must sum to unity. Those skilled in the art will recognize that the fraction of the transponder power given to individual FDM carriers is easily adjusted by setting the transmit power of the individual carriers, relative to one another, at the hub terminal.

Figure 4:
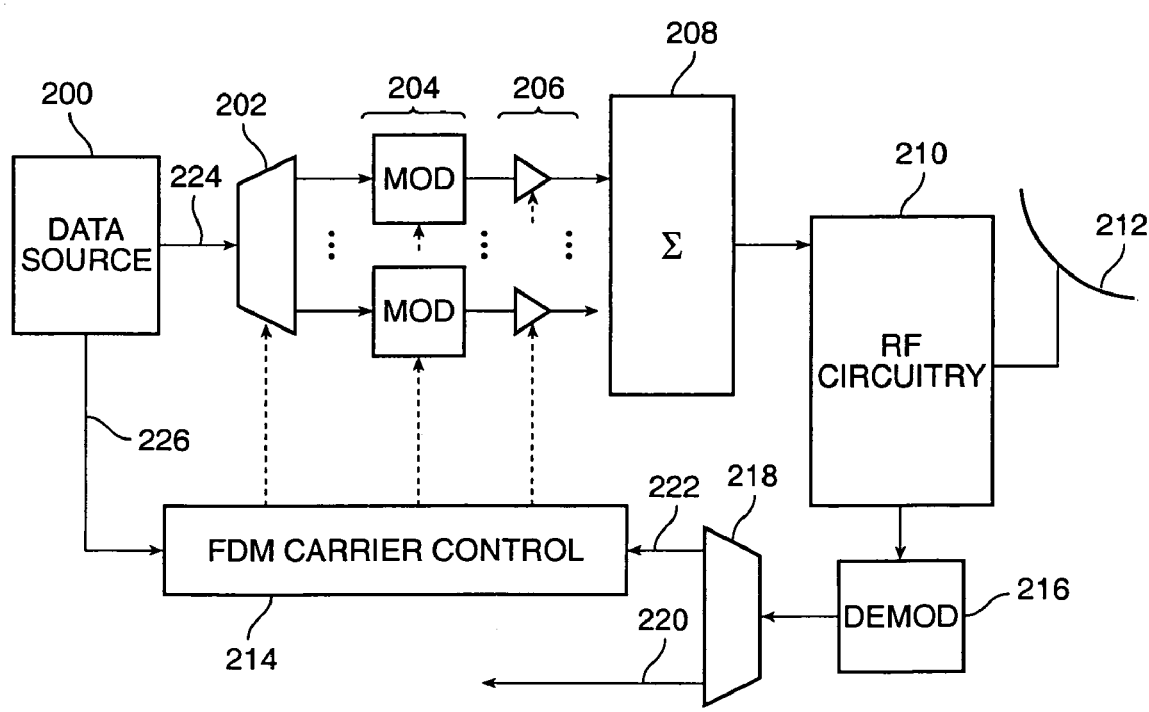
FIG. 4 is a simplified block diagram of the hub terminal illustrating the ability to allocate differing transmit powers to different FDM carriers.

FIG. 4 is a simplified block diagram of the hub terminal apparatus used to provide the plurality of FDM carriers, each with individualized transmit power setting. The apparatus contains a data source 200 which generates packetized data 224 that is individually addressed as well as the specific addresses 226 of the subscriber for which the data packet or packets are intended. A demultiplexer 202 is used to switch the data into one of the N FDM carrier modulation circuits 204. The flexible modulators 204 provide the modulation and FEC coding for each of the N carriers. Each modulator is programmable to afford one the best possible choice of data rate and coding for each of the FDM carriers. After modulation, each of the FDM carriers is adjusted in signal level by the gain control devices 206. Although only 2 modulators and gain control devices are pictured in FIG. 4, it should be understood that there is one modulator and gain control device for each FDM carrier. The summing device 208 provides a means to sum the FDM carriers into one electronic signal. The RF circuitry 210 provides upconversion to RF and high power amplification before the signal is presented to the antenna 212 for transmission. Preferably, RF circuitry 210 includes an uplink power control system to mitigate the effects of varying weather conditions on the uplink path. The uplink power control system varies the transmitted power of the hub to maintain a desired C/No at the satellite.

The hub terminal must also receive transmissions from each of the subscriber terminals. These transmissions consist of subscriber terminal data as well as received signal quality metrics such as received C/No estimates. The subscriber terminal's transmissions are received at the hub terminal by the antenna 212. The RF circuitry 210 provides low noise amplification and downconversion. The signal is demodulated within the demodulator 216 which provides data detection and FEC decoding. The demodulated bits are then split into data bits 220 and signal quality metric bits 222 by the demultiplexer 218. The FDM carrier control 214 provides the control signals for assignment of data packets to specific FDM carrier, and FDM carrier attributes such as data rate, code rate, and power level. The basis for control is the received signal quality metrics 222 from each of the subscriber terminals.

The hub terminal communicates the assignment of the subscribers terminals to one of the FDM carriers via a forward control channel. This control channel contains assignment information and is multiplexed in with the data services that the subscriber terminal receives. The multiplexing technique is most logically a time division multiplexed (TDM) approach but could any of a number of other known techniques such as frequency division multiplexing (FDM), or code division multiplexing (CDM).

Figures 5, 6:
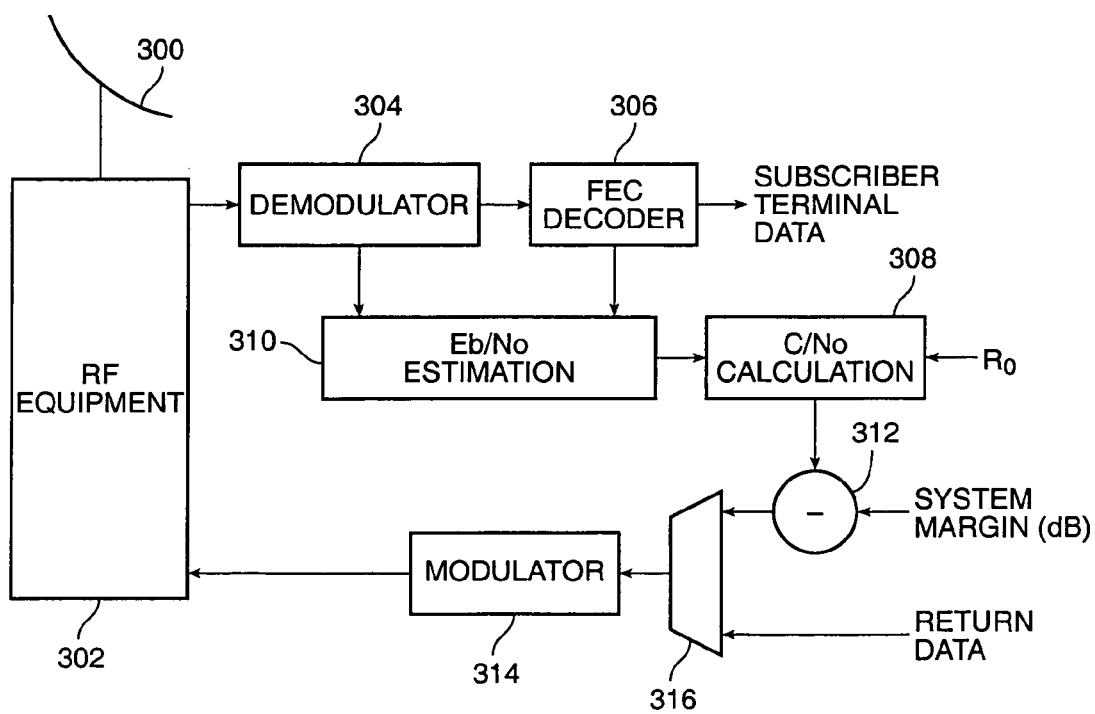
FIG. 5 is an example grouping of the subscriber terminals and the FDM carrier attributes associated with each group.
FIG. 6 is a simplified block diagram of a subscriber terminal showing the processing elements required to provide the link quality feedback to the hub terminal.

Subscriber terminals are categorized into one of N groups, according to an initial signal quality metric. For example, in a preferred embodiment of the invention the current downlink C/No measurement of each subscriber terminal is used. Each group of subscriber terminals is assigned one particular FDM carrier for subscribers in that group to receive their individually addressed packets of information. FDM carriers are assigned to each of the groups of subscriber terminals based upon the minimum C/No of a subscriber terminal within a group. The attributes of that carrier such as its data rate, modulation scheme, coding scheme, and fraction of the network resources ($a_n$) are set such that all subscriber terminals within that group can demodulate the FDM carrier with an acceptable level of data errors, as determined by the Bit Error Rate for example. An example of the grouping for N=4 carriers is shown in FIG. 5. This example provides service for subscriber terminals with up to 6 dB of variation in their received C/No while still affording subscriber terminals with largest data rate possible.

Subscriber terminals continually monitor their own signal quality and detect changes in their received C/No due to rain fading or other time varying phenomena. These subsequent C/No's, or other link quality metrics such as, but not necessarily limited to, bit error rate, are reported back to the hub terminal via a return channel. In a preferred embodiment of the invention, the return channel is shared with the satellite communications link. The information can be conveyed by any of a number known multiple access techniques such as time division multiplexing (TDMA), frequency division multiplexing (FDMA), or code division multiplexing (CDMA). Of course, the return channel can be provided by a communication medium other than the satellite link. For example, a land-based medium can be used, such as a land line, a line-of-sight wireless link, and the like.

An example of the apparatus used by the subscriber terminal to determine its received C/No and report this value back to the hub terminal is illustrated by the simplified block diagram of FIG. 6. Reception of the signal transmitted from the hub is accomplished by the antenna 300, the RF equipment 302, which provides low noise amplification and downconversion, the demodulator 304 and the FEC decoder 306. The estimation of the Eb/No is provided using information supplied by the demodulator 304 and/or the FEC decoder 306 using one or more of several commonly known techniques. Particularly effective are techniques which estimate Eb/No based upon decoder bit error correction statistics or block error detection statistics. Given the estimate of the Eb/No, the C/No can be easily computed by knowledge of the information data rate. This computation is performed in 308. It is frequently desired to add a small margin of error into the C/No calculation. This is performed by subtracting 312 a small quantity, in decibels, from the C/No estimate. The purpose of such a margin is to ensure a particular quality of service during dynamic C/No conditions using the feedback control system with has a non-zero response time. Preferably, the C/No data is multiplexed 316 into the return channel data stream and transmitted back to the hub terminal via the satellite 102 using the subscriber terminal's modulator 314, the RF equipment 302, and the antenna 300. This has the advantage of using existing hardware to provide a return channel. However, the return channel can be provided by a land line, or by a line-of-sight wireless link, or the like.

The subscriber terminal receives carrier assignments and re-assignments through the forward control channel. This is typically control data time division multiplexed (TDM) in with the service data. In response to a carrier re-assignment message in the forward control channel, the subscriber terminal re-tunes it's RF equipment 302 to the new FDM carrier frequency.

In alternate embodiments, functions such as the system margin subtraction or the C/No estimation could be performed at the hub terminal. In such an embodiment, the subscriber terminal would transmit signal quality metrics, such as, but not limited to, Eb/No, bit error rate or block error rate, to the hub terminal. In this embodiment, the FDM carrier control 214 would be suitably configured to produce the C/No quality metric upon which carrier reassignment is then based.

The hub terminal uses the feedback from all subscriber terminals to make changes in the assignments of subscriber terminals to particular FDM carriers. The assignment information is conveyed over the forward control channel. The subscriber terminals then adjust their receiver circuitry accordingly in order to receive subsequent data over the new FDM carrier, as discussed above.

In another embodiment of the present invention, the hub terminal can specify different FDM carrier attributes instead of making new assignments of subscriber terminal to pre-defined FDM carriers. Attributes of an FDM carrier include characteristics such as data rates, the modulation and coding schemes, and the fraction of transponder resources such as power and bandwidth. In this embodiment, the hub terminal can redefine the attributes of the carriers and assign the redefined carriers to the subscriber terminals. This approach obviates the need for defining an a priori set of carriers.

Variations which combine both approaches are contemplated. For example, an initial set of carriers can be defined and assigned to the subscriber terminals. As the downlink conditions change, the hub terminal can redefine the attributes accordingly and make new assignments of the subscribers to the carriers. In general, the idea is to monitor the downlink signal quality of a subscriber terminal and change its carrier assignment in order to provide reliable data transfer at a high data rate.

In the foregoing embodiment of the invention, the satellite uses a single transponder circuit to transmit a plurality of FDM carriers; i.e. all of the carriers are transmitted in a signal occupying a single frequency range. In yet another embodiment of the invention, each FDM carrier could occupy an entire transponder. Thus, for each FDM carrier, the satellite repeater includes a transponder circuit to transmit the carrier. Each carrier, therefore, occupies a different frequency range.

In this embodiment, the apparati of FIGS. 4 and 6 can still be used. However, the setting of the electronic attenuators 206 in FIG. 4 would be determined by the characteristics of each of the transponders, such as the saturated output power of the transponder and gain of the transponder, as well as the desired transponder operating point, such as the output power backoff.

Rain fades on the hub uplink will also affect the C/No as measured on each of the subscriber terminal downlinks. The response of the present invention to a 3 dB rain fade on the hub terminal uplink will be for all subscriber terminals to report a reduction in their measured C/No of 3 dB. The assignment algorithms resident in the hub terminal control will reassign subscriber terminals to FDM carriers that require 3 dB less C/No. Alternative embodiments of the present invention might also adjust carrier attributes and the number of carriers in response to this fade event. To prevent the loss in C/No, as measured by the subscriber terminals due to uplink rain fades at the hub terminal, the present invention can be used in conjunction with an uplink power control system. In FIG. 4, the RF circuitry 210 would be provisioned with an uplink power control circuit. The circuit would vary the power level of the transmitted signal in response to indications of uplink rain fade conditions. Such indications can usually be generated within the hub terminal itself by monitoring the satellite downlink.

Prior art techniques, such as the one described in U.S. Pat. No. 4,941,199, attempt to maintain the C/No constant at the satellite. This is accomplished by providing compensation for uplink fades at the hub terminal. The present invention includes an uplink power control circuit in order to compensate for uplink fades. However, unlike the prior art, the present invention is advantageous in providing compensation for conditions which result in downlink fades at the subscriber terminals. Thus, the present invention is overall less susceptible to the signal degrading effects of environmental phenomena such as rain fade.

What is claimed is:

1. In a narrowcast satellite communication network having a hub station transmitting to a satellite repeater and a plurality of receiving subscriber terminals, a method comprising:

transmitting data from said hub station addressed to selected ones of said receiving subscriber terminals to said satellite repeater on a selection of channels;

receiving and relaying at said satellite repeater, said data on said selection of channels to a selected subset of said receiving subscriber terminals using less than all available signal carriers;

at each receiving subscriber terminal, determining signal quality metrics on the basis of qualities of said signal carriers received from said satellite repeater and addressed to said receiving subscriber terminal;

communicating said signal quality metrics determined at said receiving subscriber terminals to said hub station;

at said hub station, grouping pluralities of said receiving subscriber terminals into subgroups according to said signal quality metrics;

varying at least one of a frequency bandwidth, a power level, a coding scheme, a modulation scheme and a data rate to produce a plurality of redefined carriers, and signaling said subgroups to use at least one of said redefined carriers for subsequent reception of said data; and narrowcasting from said hub station said subsequent data to said subgroups of receiving subscriber terminal using said at least one of said redefined carriers via said satellite repeater.

2. The method of claim 1 further include providing ground-based communication links between said hub station and each of said receiving subscriber terminals, wherein said step of communicating to said hub station is performed via said ground-based communication links.

3. The method of claim 1 wherein said carriers are FDM carriers.

4. The method of claim 1 wherein one of said signal quality metrics is a signal-to-noise ratio.

5. A narrowcast network system comprising:

a terrestrial hub station for selectively narrowcasting data to subscribers;

a satellite repeater for receiving and relaying narrowcast data from said hub station to selected subscribers via a plurality of carriers;

a plurality of terrestrially deployed receiving subscriber terminals associated with said subscribers, each said receiving subscriber terminal in selectable communication with said satellite;

said subscriber terminals having:

circuit means operative to receive transmissions from said satellite repeater via at least one selectable carrier;

at least some of said subscriber terminals having:

means for determining a signal quality metric, said signal quality metric based on received signals from said satellite repeater; and circuit means operative to communicate said signal quality metric to said hub station;

said hub station comprising circuit means for adapting data transmission modes narrowcasted to said receiving subscriber terminals based on said at least one signal quality metric, including:

means for grouping said receiving subscriber terminals according to their associated signal quality metric into subgroups and for associating said subgroups with a carrier at said satellite repeater; and circuit means for selectively narrowcasting to said subgroups via said satellite repeater, including means for generating control signals to said satellite repeater to cause said satellite repeater to generate a plurality of carriers according to said subgroups, said carriers varying in frequency and at least in one of bandwidth, power level, coding scheme, modulation scheme, and data rate.

6. The narrowcast network system according to claim 5 further including circuitry operative to receive data packets addressed to specific ones of said receiving subscriber terminals and circuitry operative to transmit each data packet using at least one of said carriers having attributes based on said destination address and said signal quality metrics.

7. The narrowcast network system of claim 5 wherein said at least one signal quality metric is a signal-to-noise ratio.

8. The narrowcast network system of claim 5 further including a plurality of return channels, each return channel effective for communication between one of said receiving satellite terminals and said hub station, and further including circuitry to communicate said signal quality metrics over said return channels.

9. The narrowcast network system of claim 8 wherein said return channels are communication links to said satellite.

10. The narrowcast network system of claim 8 wherein said return channels are land lines coupling said receiving subscriber terminals to said hub station.

11. The narrowcast network system of claim 8 wherein said return channels are line-of-sight wireless communication links coupling said receiving subscriber terminals to said hub station.

12. In a narrowcast network system, a hub station for communicating with selected receiving satellite terminals via a satellite repeater comprising:

first circuitry configured to receive signal quality metrics for carriers from said satellite repeater from said receiving subscriber terminals;

second circuitry configured to receive data packets destined for a plurality of said receiving subscriber terminals, each data packet having an address of one of said receiving subscriber terminals;

third circuitry configured to transmit each data packet using a carrier having attributes based on said destination address; and fourth circuitry operative to group pluralities of said receiving subscriber terminal according to said signal quality metrics and to adapt mode of information transfer via said satellite repeater to said groups of said receiving subscriber terminals by selecting at least one carrier for each said group and varying at least bandwidth, power level, coding scheme, a modulation scheme and data rate.

13. The hub station in the narrowcast network system of claim 12 further including circuitry for transmitting control signals to the satellite repeater to control transmitted power of said carriers.

* * * * *